United States Patent
Bedrosian

(10) Patent No.: US 8,401,025 B2
(45) Date of Patent: Mar. 19, 2013

(54) WINDOWING TECHNIQUE FOR ADAPTIVE CLOCK RECOVERY AND OTHER SIGNAL-PROCESSING APPLICATIONS

(75) Inventor: P. Stephan Bedrosian, Andover, MA (US)

(73) Assignee: LSI Corporation, San Jose, CA (US)

( * ) Notice: Subject to any disclaimer, the term of this patent is extended or adjusted under 35 U.S.C. 154(b) by 304 days.

(21) Appl. No.: 12/768,852

(22) Filed: Apr. 28, 2010

(65) Prior Publication Data

US 2011/0267946 A1  Nov. 3, 2011

(51) Int. Cl.
*H04L 7/00* (2006.01)

(52) U.S. Cl. .................... 370/395.62; 370/516

(58) Field of Classification Search ............... 370/395.6, 370/395.62, 503, 508, 509, 512, 516–519
See application file for complete search history.

(56) References Cited

U.S. PATENT DOCUMENTS

| | | | | |
|---|---|---|---|---|
| 5,896,427 | A * | 4/1999 | Muntz et al. | 375/372 |
| 6,714,548 | B2 | 3/2004 | Lauret | |
| 7,315,546 | B2 * | 1/2008 | Repko et al. | 370/395.62 |
| 2003/0063625 | A1 * | 4/2003 | Belk et al. | 370/503 |
| 2003/0081550 | A1 * | 5/2003 | Mitchell et al. | 370/232 |
| 2004/0208268 | A1 * | 10/2004 | Yin Ying | 375/354 |
| 2006/0013263 | A1 | 1/2006 | Fellman | |
| 2011/0164630 | A1 * | 7/2011 | Bedrosian | 370/516 |

FOREIGN PATENT DOCUMENTS

| | | |
|---|---|---|
| EP | 1 455 473 B1 | 4/2008 |
| JP | 07046257 A | 2/1995 |
| JP | 08-316948 A | 11/1996 |
| JP | 2006518557 A | 8/2006 |
| JP | 2009118272 A | 5/2009 |
| KR | 10-2004-0015617 A | 2/2004 |
| WO | WO 2005/020486 | 3/2005 |

* cited by examiner

*Primary Examiner* — Michael Thier
*Assistant Examiner* — Curtis A Alia
(74) *Attorney, Agent, or Firm* — Mendelsohn, Drucker, & Associates, P.C.; Steve Mendelsohn

(57) ABSTRACT

In one embodiment, an adaptive clock recovery (ACR) system generates a current delay-offset estimate value ($D_{OE}(i)$) using a window technique that selects the larger of (i) the maximum delay-offset value ($D_{OP}$) in the previous window and (ii) the maximum delay-offset value so far ($D_{OM}$) in current window. This windowing technique can be implemented without having to store all of the individual values over a specified window size, as in a conventional sliding window technique. This windowing technique can be used to find extreme (i.e., either maximum or minimum) values for applications other than ACR systems.

4 Claims, 5 Drawing Sheets

100

WINDOWING TECHNIQUE FOR ADAPTIVE CLOCK RECOVERY AND OTHER SIGNAL-PROCESSING APPLICATIONS

CROSS-REFERENCE TO RELATED APPLICATIONS

This application is related to U.S. patent application Ser. No. 12/729,606 filed on Mar. 23, 2010 ("the '606 application) and U.S. patent application Ser. No. 12/730,286 filed on Mar. 24, 2010 ("the '286 application"), the teachings of both of which are incorporated herein by reference in their entirety.

BACKGROUND

1. Field of the Invention

The present invention relates to window-based processing, and, more specifically but not exclusively, to windows of packet delay-offset values used in timing recovery in packet-based communication systems.

2. Description of the Related Art

This section introduces aspects that may help facilitate a better understanding of the invention. Accordingly, the statements of this section are to be read in this light and are not to be understood as admissions about what is prior art or what is not prior art.

The goal for a receiver of a data signal in a data communication network that employs clock recovery is for the receiver to derive, from the received data signal, a clock signal representing the time domain of the data signal, so that the receiver can use the derived clock signal to process (e.g., recover the data from) the data signal. In physical layer-based clock-recovery systems, the clock signal is encoded in the data signal, which is transmitted as a single continuous stream of bit transitions (e.g., 1s and 0s). In addition, the timing nature of these bit transitions is preserved between the transmitter and receiver to create a single timing domain. The clock signal can then be recovered by exploiting the regularity of transitions between the 1s and 0s represented in the data signal. In packet-based systems, the data signal does not arrive at the receiver as a single continuous stream of 1s and 0s. The nature of packet-based systems is to transmit packets when data is available, resulting in a bursty exchange of packets between a transmitter and a receiver. In addition, the bits representing the packet data are synchronized to a local oscillator unique to each transmitter or receiver, creating multiple timing domains between the transmitter and receiver. In some packet-based systems in which the packets are transmitted by the transmitter at a relatively steady rate, it is possible to derive a clock signal from the times at which the packets arrive at the receiver.

Some packet-based data communication applications, such as circuit emulation services (CES), in which circuit-based signals are converted to packet-based signals for transmission and then reconverted back to circuit-based signals at the receiver, have relatively stringent timing requirements for the accuracy of the derived clock signal. One such timing requirement is controlled phase movement or the maximum time interval error (MTIE) limits of the derived clock signal for DS1 or E1 data signals. These stringent timing requirements can be difficult to satisfy in adaptive clock recovery packet-based communication systems in which the overall packet delay (i.e., the duration from the time that a packet leaves the transmitter until the time that the packet arrives at the receiver) can vary for a periodic sequence of transmitted packets due to such phenomena as network loading and path rerouting.

It is a known phenomenon in many data networks that the statistical packet-delay characteristics change as overall network load changes. Thus, the duration between the arrival times of consecutive packets at a receiver can vary unpredictably as network load varies over time. Furthermore, when the path selected for transmitting packets of a particular communication session from a particular transmitter (source) to a particular receiver (destination) changes, e.g., due to a network reconfiguration associated with intermediate node congestion, link failure, or maintenance activities, the time domain of the packets arriving at the receiver will experience a positive or negative step change (referred to herein as a "step-delay"), depending on whether the new path is longer or shorter (in terms of overall delay) than the old path. Clock recovery systems at receivers in such packet-based networks will typically need to take the effects of these phenomena into account in order to satisfy their relevant timing requirements.

SUMMARY

In one embodiment, the present invention is a machine-implemented windowing method for finding an extreme value. A previous extreme value is determined for a previous window corresponding to a previous plurality of items. For each item in a current window corresponding to a current plurality of items, (1) a current extreme value so far is determined in the current window corresponding to said each item and any previously processed items in the current window, (2) an overall extreme value is determined based on the previous extreme value and the current extreme value so far, and (3) further processing associated with the items is performed based on the overall extreme value.

In another embodiment, the present invention is an adaptive clock recovery (ACR) system for a receiver. The ACR system comprises a first closed-loop control processor, a delay-offset estimation component, a delay-offset compensation component, and a second closed-loop control processor. The first closed-loop control processor generates a reference phase signal from an input phase signal representing packet delay values corresponding to arrival times of packets at the receiver. The delay-offset estimation component implements a windowing method based on the packet delay values and the reference phase signal to generate a delay-offset estimate signal representative of a delay-floor phase offset for the packet arrival times relative to the reference phase signal. The delay-offset compensation component generates a delay-offset-compensated phase signal based on the reference phase signal and the delay-offset estimate signal. The second closed-loop control processor generates, from the delay-offset-compensated phase signal, an output phase signal that can be used to generate a recovered clock signal. To implement the windowing method, the delay-offset estimation component (a) determines a previous maximum delay-offset value (e.g., $D_{OP}$) for a previous window corresponding to a previous plurality of received packets and (b) for each received packet in a current window corresponding to a current plurality of received packets, (1) determines a current maximum delay-offset value so far in the current window corresponding to said each received packet and any previously received packets in the current window and (2) determines a current delay-offset estimate value based on the previous maximum delay-offset value and the current maximum delay-offset value so far.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
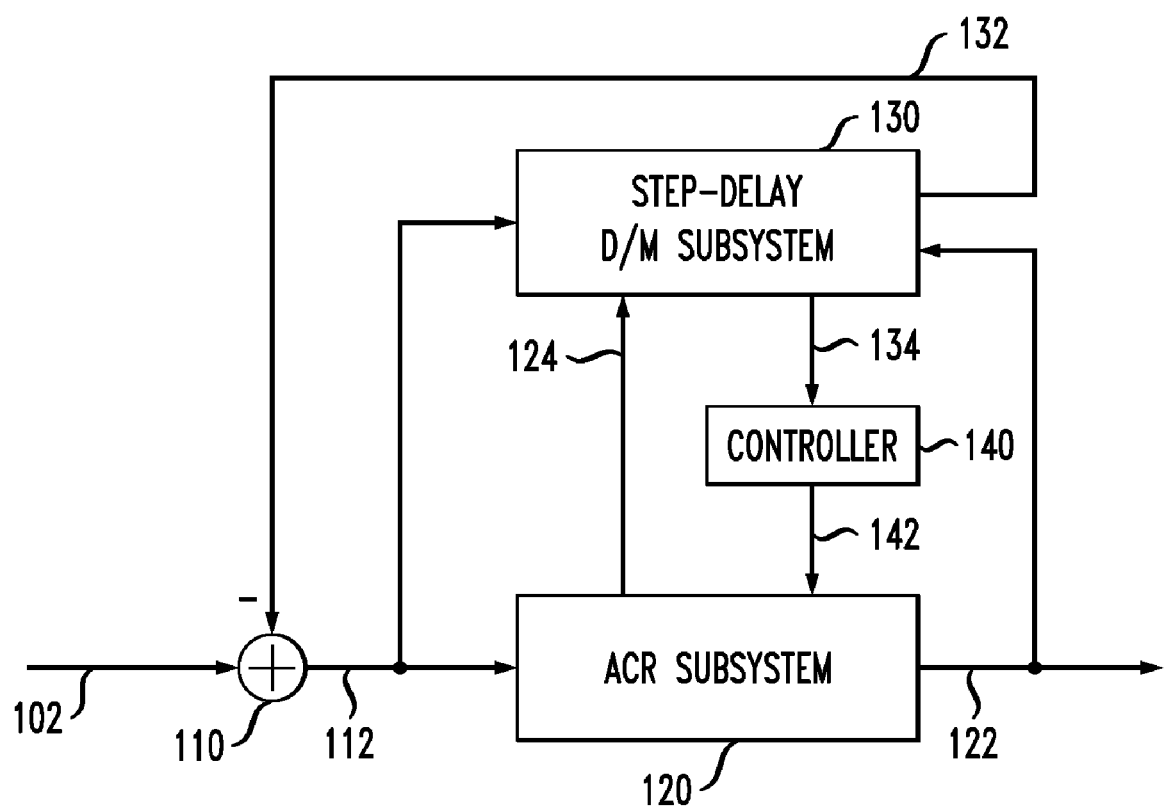
FIG. 1 is a high-level block diagram of an adaptive clock recovery (ACR) system according to one embodiment of the present invention.

FIG. 1 is a high-level block diagram of an adaptive clock recovery (ACR) system 100 according to one embodiment of the present invention. ACR system 100 is implemented in a receiver in a node of a packet-based communication network. ACR system 100 processes (digital) input packet arrival phase signal 102 to generate (digital) output phase signal 122, which can be used to control the output frequency and phase of a numerically controlled oscillator (NCO).

Input packet arrival phase signal 102 contains a phase value corresponding to the propagation delay of each packet received at the receiver. The packet propagation delay can be either the actual propagation delay measured with embedded timestamps, or the relative propagation delay measured by taking the difference between the actual arrival time and the expected arrival time. Due to such phenomena as network loading and path rerouting and other factors that influence packet-delay variation, the phase values of input packet arrival phase signal 102 will vary such that, if input packet arrival phase signal 102 were directly used to generate a recovered clock signal, that recovered clock signal would likely fail to satisfy applicable stringent phase stability timing requirements, such as the MTIE for DS1 or E1 data signals.

To address these phenomena, ACR system 100 processes the input packet arrival phase signal 102 to generate output phase signal 122 having compensated phase values that vary sufficiently slowly over a controlled phase range such that a recovered clock signal generated, for example, by applying output phase signal 122 to an NCO, will satisfy the applicable timing requirements.

As shown in FIG. 1, one embodiment of ACR system 100 includes ACR subsystem 120, step-delay detection and measurement (D/M) subsystem 130, step-delay pre-compensation component 110, and controller 140.

One traditional way for an adaptive clock recovery system to derive a recovered clock signal from a periodic sequence of received packets is as follows. The frequency of the recovered clock is established by the average arrival rate of packets received at the receiver. The phase of the recovered clock singal is established by the average packet delay of a series of received packets. Each packet delay is indicative of the propagation delay for a given packet from the source node to the destination node. The periodic sequence of packets from the source to destination node is also known as a packet flow. As the average propagation delay fluctuates, e.g., due to changes in network loading, such an ACR system would detect and adjust the phase of the recovered clock signal to track these delay fluctuations. Due to the nature of packet networks, packet delays tend to fit a "long-tailed" or "right-tailed" statistical distribution. As background traffic loading increases, the "right" tail of the distribution increases and thus causes the average packet delay to also increase. Therefore, ACR systems that phase lock to the average packet delay will tend to phase modulate their recovered clocks in proportion to network loading. According to the embodiment of FIG. 1, instead of phase aligning to the average packet delay of a sequence of packets, ACR system 100 phase aligns to the shortest packet delay, also referred to herein as the delay-floor. For a given path through a network, there is a minimum possible propagation time for a packet to travel from the source node to the destination node. This minimum propagation time is related to a packet having the minimum residence through all intermediate packet switches in the path between the source and destination nodes. The minimum packet propagation time for a given path is commonly called the delay-floor.

Depending on the particular circumstances (e.g., the current network load, number and type of packet switches), a given packet can and typically will take longer than the delay-floor to travel over a given path, but it cannot travel any faster than the delay-floor. Nevertheless, there will be some packets that will arrive at the receiver close to the delay-floor. Although the frequency of packets arriving close to the delay-floor decreases as the network load increases, there will still be some that do so.

The delay value of the packet having the smallest delay, e.g., for all packets arriving within a specified sample window, can be used by the receiver to define the current value of the delay-floor for that sample window. Since packet-delay characteristics can change, the specified sample window used to compute the delay-floor value should be updated. This update process can be done in a number of ways including, for example, a sliding window method where "M" of the most-recent packet-delay values are compared. After defining the current delay-floor value, in order to avoid undesirable fluctuations in the phase of the recovered clock signal, the phase of the recovered clock signal is adjusted to align with the delay-floor value. In this way, the frequency of the recovered clock is based on the average packet arrival rate, but the phase of the recovered clock is based on the delay-floor of a moving sample window.

When the path for a particular packet flow changes (e.g., due to a network reconfiguration), the minimum amount of time that it takes for a packet to travel from the source node to the destination node can and typically will change. If the minimum propagation time for a packet increases from the old path to a longer, new path, then the positive change in the delay-floor is referred to as a positive step-delay. If the minimum propagation time decreases from the old path to a shorter, new path, then the negative change in the delay-floor is referred to as a negative step-delay.

Between such step-delays, ACR system 100 and, in particular, ACR subsystem 120 tracks the typically constant delay-floor for the received packets in order to generate output phase signal 122 having substantially constant phase values. When a step-delay occurs, ACR system 100 and, in particular, the combination of step-delay D/M subsystem 130 and step-delay pre-compensation component 110 detects, measures, and pre-compensates for the shift in the delay-floor associated with that step-delay to enable ACR subsystem 120 to continue to track what it will see as a relatively constant delay-floor.

In general terms, based on the value of step-delay estimate signal 132 generated by step-delay D/M subsystem 130, step-delay pre-compensation component 110 adjusts the phase values in input packet arrival phase signal 102 to generate step-delay-compensated phase signal 112 having step-delay-compensated phase values. Step-delay D/M subsystem 130 processes step-delay-compensated phase signal 112 to detect the presence of and measure the sign (i.e., positive or negative shift direction) and magnitude of step-delays occurring in phase signal 112. In parallel with D/M subsystem 130, ACR subsystem 120 filters step-delay-compensated phase signal 112 to generate a reference phase signal 124 having reference phase values. In addition, ACR subsystem 120 generates output phase signal 122 having output phase values that are filtered versions of the reference phase values.

More particularly, when the processing of ACR system 100 is initialized and until the first step-delay is detected by step-delay D/M subsystem 130, step-delay estimate signal 132 has a value of zero, and step-delay-compensated phase signal 112 is identical to input packet arrival phase signal 102. When the first step-delay is detected in step-delay-compensated phase signal 112, e.g., due to a change in the path that the packets take through the network from the source node to the destination node containing the receiver that implements ACR system 100, step-delay D/M subsystem 130 detects and measures that step-delay, where the value of step-delay estimate signal 132 represents the sign and magnitude of that first step-delay event.

When the new path is longer (in terms of propagation delay) than the old path, then the step-delay estimate signal 132 will have a sign (e.g., positive) that instructs step-delay pre-compensation component (e.g., subtraction node) 110 to apply a negative phase-shift to input packet arrival phase signal 102 to generate step-delay-compensated phase signal 112. On the other hand, when the new path is shorter (in terms of propagation delay) than the old path, then the step-delay estimate signal 132 will have a sign (e.g., negative) that instructs step-delay pre-compensation component 110 to apply a positive phase-shift to input packet arrival phase signal 102 to generate step-delay-compensated phase signal 112. Step-delay D/M subsystem 130 keeps the value of step-delay estimate signal 132 constant until the next step-delay (if any) is detected in step-delay-compensated clock signal 112.

The goal of ACR system 100 is to generate output phase signal 122 having sufficient stability to control the frequency and phase of an output NCO (for example) to satisfy the applicable timing requirements (e.g., MTIE). To achieve that sufficiently constant time domain over multiple step-delays, step-delay D/M subsystem 130 generates the value of step-delay estimate signal 132 based on the accumulated sum of all of the previously detected and measured step-delays. Thus, if the first step-delay is a positive step-delay having a magnitude of 3 phase units, and the second step-delay is a negative step-delay having a magnitude of 1 phase unit, then, after the second step-delay is detected and measured, the step-delay estimate signal 132 will have a value of +2 phase units. If there is an LOS (loss of signal) or other input fault of the input packet stream, then the step-delay accumulator in D/M subsystem 130 will be reset to 0, and the process of step-delay detection, pre-compensation, and accumulation will be restarted with a step-delay estimate signal 132 of 0 phase units.

Controller 140 coordinates the operations of ACR subsystem 120 based on signals received from step-delay D/M subsystem 130. In particular and as described in further detail below, when step-delay D/M subsystem 130 detects a new step-delay in step-delay-compensated phase signal 112, subsystem 130 asserts step-delay detection signal 134 applied to controller 140. In response, controller 140 suspends at least some of the processing of ACR subsystem 120 (i.e., places ACR subsystem 120 in holdover mode) via control signal 142. After step-delay D/M subsystem 130 completes its measurement of the new step-delay and generates an updated value for step-delay estimate signal 132, subsystem 130 de-asserts step-delay detection signal 134. In response, controller 140 resumes the full processing of ACR subsystem 120 (i.e., terminates the holdover mode) via control signal 142. This temporary suspension of at least some of the processing of ACR subsystem 120 during the time interval between detection and measurement of the new step-delay is referred to as holdover mode.

The purpose of the holdover mode is to avoid having the impact of the detected step-delay significantly and adversely affect the timing of output phase signal 122 while the step-delay magnitude is measured. Holdover mode stabilizes the output phase at output phase signal 122 and, more importantly, the phase reference at reference phase signal 124. Reference phase signal 124 is used to measure the magnitude of the newly detected step-delay and remains constant for the duration of the measurement period. Once the new step-delay has been measured and incorporated into step-delay estimate signal 132, this value is subtracted for all incoming packet arrival phase values 102 at the summation point 110. Once the step-delay correction is applied, holdover mode is exited, and the full processing of ACR subsystem 120 can be safely resumed using step-delay-compensated phase signal 112, which will now be generated taking into account all of the previously detected step-delays, including the new step-delay.

Figure 2:
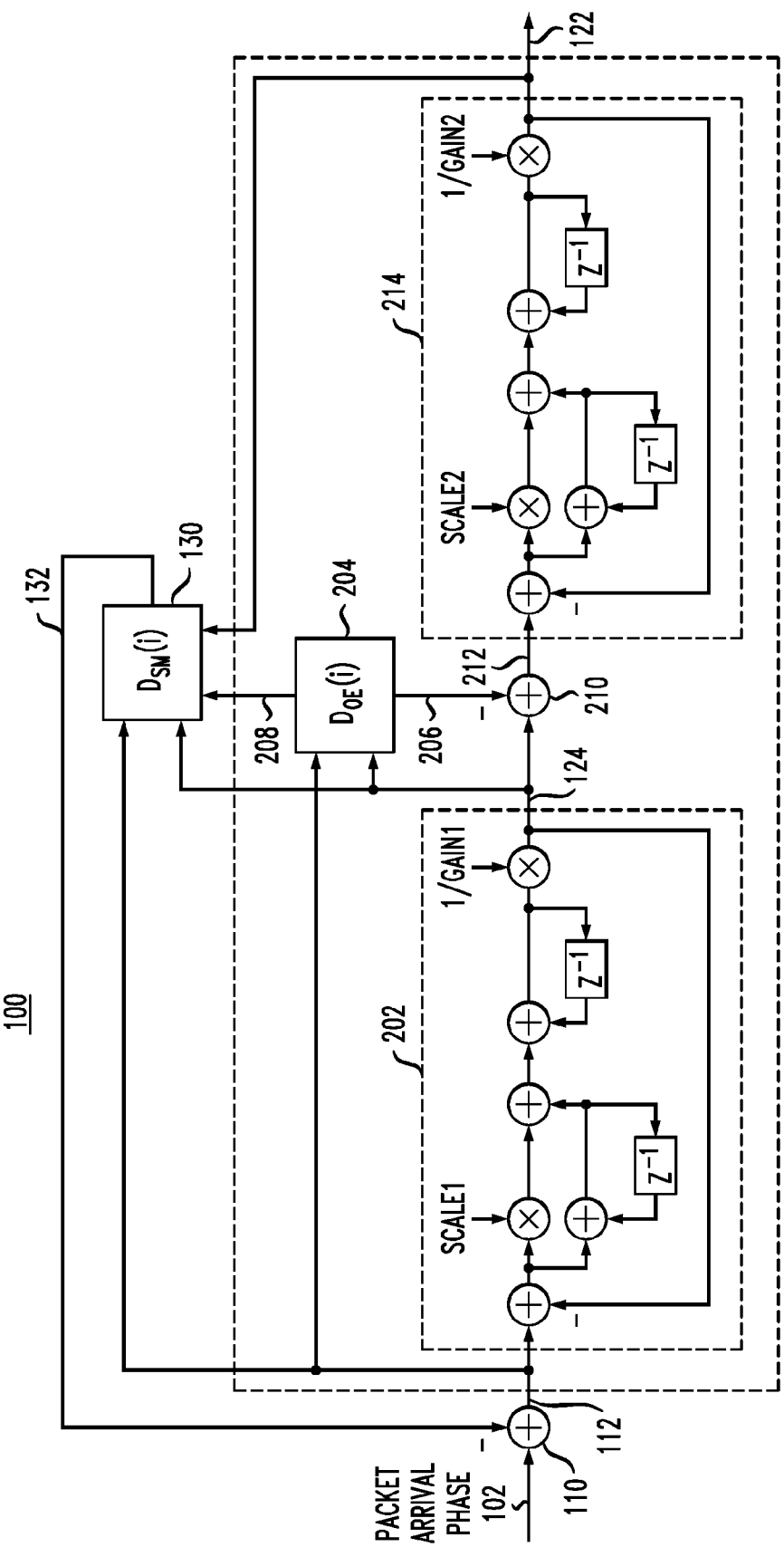
FIG. 2 shows a more-detailed block diagram of the ACR system of FIG. 1, according to one embodiment of the present invention.

FIG. 2 shows a more-detailed block diagram of ACR system 100 of FIG. 1, according to one embodiment of the present invention. As shown in FIG. 2, ACR subsystem 120 of FIG. 1 includes first digital proportional-integral (PI) processor 202, delay-offset estimation component 204, delay-offset compensation component 210, and second digital PI processor 214. Note that the flow of control signals from step-delay D/M subsystem 130 to ACR subsystem 120 via controller 140 is not shown in the representation of ACR system 100 depicted in FIG. 2, although the flow of signals from ACR subsystem 120 to step-delay D/M subsystem 130 is included in the figure.

In general terms, first PI processor 202 generates a phase reference (represented by signal 124) from the step-delay-compensated phase (represented by signal 112), delay-offset estimation component 204 locates the delay-floor (represented by signal 206), delay-offset compensation component 210 generates the phase at the delay-floor (represented by signal 212), and second PI processor 214 frequency filters or smoothes that delay-floor phase to generate an output phase (represented by signal 122).

ACR subsystem 120 performs delay-offset compensation that adjusts the phase values of output phase signal 122 to be substantially equal to the current estimate of the delay-floor. This is accomplished by determining the delay offset $D_O(i)$ between (1) the average packet arrival time as indicated by the mean phase reference value $\mu(i)$ in reference phase signal 124 and (2) the arrival times of those packets that arrive at or sufficiently near the delay-floor as indicated by the packet phase (i.e., delay) values $D(i)$ in step-delay-compensated phase signal 112. This statistical process is called delay-offset estimation. In order to perform this estimation, all received packet arrival times as indicated by the packet delay values $D(i)$ in step-delay-compensated phase signal 112 are compared with the average packet arrival time of the previously received packets as indicated by the mean phase reference value $\mu(i)$ in reference phase signal 124. Those packets that arrive later than the average packet arrival time are ignored by the estimation process and assigned a delay-offset value $D_O(i)$ of 0. Packets that arrive earlier than the average packet arrival time are considered as candidates for defining the delay-floor and assigned a delay-offset value $D_O(i)$ equal to the difference between the average packet arrival time (as indicated by the mean phase reference $\mu(i)$) and their arrival time (as indicated by the packet delay $D(i)$). Groups or statistical sampling windows of consecutive delay-offset values $D_O(i)$ are compared, and the largest value of the group becomes the delay-offset estimate $D_{OE}(i)$ and output as a delay-offset estimate signal 206.

In particular, first PI processor 202 receives and frequency filters step-delay-compensated phase signal 112 from step-delay pre-compensation component 110 to generate reference phase signal 124. Reference phase signal 124 is a measure of the average phase difference of the expected packet arrival time and the actual packet arrival time of the statistical population of all received packets. The delay-offset estimation component 204 uses reference phase signal 124 as a mean phase reference $\mu(i)$ to determine if the arrival time of each received packet 112 is earlier or later than the average packet arrival time. If the packet arrival time is greater than the step-delay-compensated phase signal 112, then the packet took longer to traverse the network than the statistical mean of the previously received packets. Likewise, if the packet arrival time is less than the step-delay-compensated phase signal 112, then the packet took less time to traverse the network than the statistical mean of the previously received packets. Packets with arrival times lower than the mean arrival time are candidates to define the delay-floor. The delay-offset estimation component 204 calculates a delay-offset value $D_O(i)$ for each received packet according to Equation (1) as follows:

$$\text{For } \mu(i) > D(i), D_O(i) = \mu(i) - D(i)$$

$$\text{For } \mu(i) \leq D(i), D_O(i) = 0 \qquad (1)$$

Thus, if the mean phase reference $\mu(i)$ is greater than the packet delay $D(i)$, then the delay-offset value $D_O(i)$ for that packet is the difference between those two values. Otherwise, the delay-offset value $D_O(i)$ for that packet is set to zero. Note that first PI processor 202 processes both types of packets in continuously updating reference phase signal 124 to yield the mean phase reference $\mu(i)$.

Figure 3:
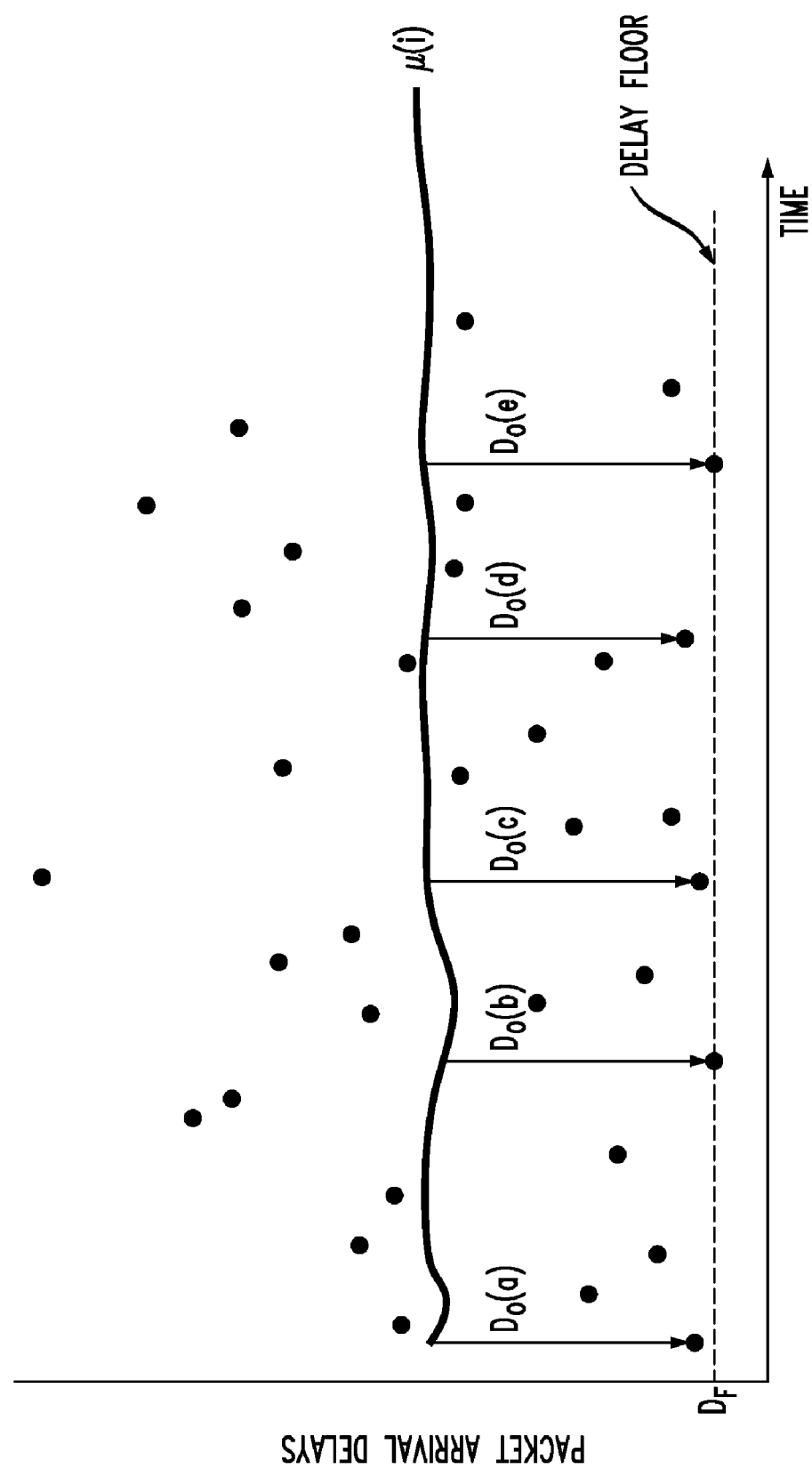
FIG. 3 graphically illustrates the processing of the delay-offset estimation component of FIG. 2 relative to the mean phase reference $\mu(i)$.

FIG. 3 graphically illustrates the processing of delay-offset estimation component 204 of FIG. 2 relative to the mean phase reference $\mu(i)$. In FIG. 3, each dot represents the arrival of a different packet at a particular time (X-axis value) and with a particular packet-arrival delay (Y-axis value), and the time-varying mean phase reference $\mu(i)$ is plotted relative to the packet-arrival delays for the received packets. In FIG. 3, the delay-floor is represented as having a fixed packet-arrival delay $D_F$. As seen in FIG. 3, packets arrive with delays above and below the mean phase reference $\mu(i)$, but no packet arrives with a delay less than the delay-floor $D_F$. It should also be noted that the percentage of packets that have delays equal to the delay-floor will be dependent on a number of factors affecting the propagation of packets through a network for a given packet flow. Generally, the higher the network traffic load of competing traffic through common switching elements, the lower the percentage of delay-floor packets.

For each packet delay $D(i)$, a delay-offset value $D_O(i)$ is computed relative to the mean phase reference $\mu(i)$ based on Equation (1). The largest delay-offset value $D_O(i)$ over a specified duration or sample window is indicative of the difference between the current value of the mean phase reference $\mu(i)$ and the delay-floor. Due to temporal variations in the mean phase reference $\mu(i)$, it is expected that there will also be variations in the largest delay-offset values $D_O(i)$ for different periods of time having the same specified duration. As such, a windowing method that looks at a specified number M of the most-recent delay-offset values $D_O(i)$ tends to track changes in the mean phase reference $\mu(i)$ and can therefore be used to yield an accurate estimate $D_{OE}(i)$ of the delay offset between the mean phase reference $\mu(i)$ and the delay-floor, as generated using Equation (2) as follows:

$$D_{OE}(i) = \operatorname*{MAX}_{n=i}^{i-M+1} D_O(n) \qquad (2)$$

where delay-offset estimation component 204 of FIG. 2 transmits the current delay-offset estimate $D_{OE}(i)$ to delay-offset compensation component 210 as delay-offset estimate signal 206. In order to implement the MAX function, the M previous delay-offset values $D_O(i)$ are individually stored. When a new packet arrives, the delay-offset estimate $D_{OE}(i)$ is re-computed using Equation (2), and the oldest delay-offset value $D_O(i-M+1)$ is replaced in memory by the newest delay-offset value $D_O(i)$.

Although Equation (2) corresponds to a max sliding-difference window, other types of overlapping or non-overlapping windows or a combination of overlapping and non-overlapping windows may be used. Although max sliding-difference windows can be designed to yield a different value of delay-offset estimate $D_{OE}(i)$ for each new packet arrival, such implementations tend to increase the implementation complexity.

Delay-offset compensation component 210 adjusts the phase of reference phase signal 124 based on the value of delay-offset estimate signal 206 to generate delay-offset-compensated phase signal 212. In particular, the mean phase reference $\mu(i)$ of reference phase signal 124 is decreased by the delay-offset estimate $D_{OE}(i)$, which will always be a non-negative number. This phase compensation will align phase signal 212 with the current location $D_F(i)$ of the delay-floor, as reflected in Equation (3) as follows:

$$D_F(i) = \mu(i) - D_{OE}(i) \qquad (3)$$

Because the delay-offset estimate $D_{OE}(i)$ is based on a statistical analysis of a contiguous set of M packets, there can be discontinuous variations over time in the phase of delay-offset-compensated phase signal 212 due to the delay characteristics of each set of M packets. In order to frequency filter or smooth these phase discontinuities, second PI processor 214 performs phase-smoothing on delay-offset-compensated phase signal 212 to generate output phase signal 122 having a (fully) averaged phase.

In one possible implementation, in order to provide delay-offset measurement stability, the size of the sliding window of Equation (2) is set to be at least 40 times smaller than the time constant of first PI processor, which is itself based on the cutoff frequency of first PI processor 202. Since the function of second PI processor 214 is to phase-smooth the compensated phase signal 212, second PI processor 214 is designed to track the output frequency of first PI processor 202 by setting the bandwidth of second PI processor 214 to be greater than (e.g., about 2 to 2.5 times) the bandwidth of first PI processor 202. Generally, both first and second PI processors 202 and 214 are adjusted to yield an over-damped system response with a damping factor of about 4.

Step-Delay Compensation

The three stages of handling step-delays (i.e., substantial, instantaneous shifts) in the delay-floor are detection, measurement, and pre-compensation. In ACR system 100 of FIGS. 1 and 2, step-delay D/M subsystem 130 performs the detection and measurement stages, based on reference and output phase signals 124 and 122 and other information generated by delay-offset estimation component 204 and provided to D/M subsystem 130 via signal 208, while step-delay pre-compensation component 110 performs the pre-compensation stage based on step-delay estimate signal 132 generated by D/M subsystem 130.

Step-delay detection involves the detection of the occurrence of a step change in the delay-floor. As described in further detail below, in making that detection, the sign of the step change is also determined. The quicker the detection, the greater the prevention of the undesirable result of ACR system 100 changing output phase signal 122 due to tracking an uncompensated step-delay.

Step-delay measurement involves the estimation of the magnitude of the change in the delay-floor. Note that the step-delay measurement process is different from the step-delay detection process and may require a longer period of time in order to measure the size of the shift in the delay-floor with sufficient accuracy. This is mainly due to the statistical delay variation of the received packets after the step-delay event.

In general, for a given level of accuracy, the time that it takes to measure the size of the step-delay is inversely proportional to the occurrence of received packets having delays near the delay-floor over a given sample size. For low network traffic-load conditions, there is less packet delay variation, and a greater number of packets arrive close to the delay-floor. In such situations, a given level of accuracy of the step-delay measurement can be achieved in a shorter period of time than for high traffic-load conditions, where fewer packets arrive close to the delay-floor.

Step-delay pre-compensation involves applying a phase correction, based on the direction and magnitude of the shift in the delay-floor, to the ACR process. In theory, this correction compensates the ACR output (e.g., output phase signal 122 of FIG. 1) so that the output phase stays constant despite the step change in the delay-floor. In ACR system 100 of FIG. 1, the step-delay pre-compensation is implemented using a pre-compensation scheme in which the phase of input packet arrival phase signal 102 is adjusted prior to the filtering of ACR subsystem 120.

The processing involved in the detection, measurement, and pre-compensation of step-delays is described in further detail in the '606 and '286 applications, which are incorporated herein by reference.

Alternative Windowing Technique

ACR system 100 of FIG. 1 has been described earlier in the context of a sliding-window technique that generates a current value $D_{OE}(i)$ for the delay-offset estimate by finding the maximum value for the delay-offset $D_O(i)$ in the most-recent M packets, as represented above in Equation (2). One of the disadvantages of such a sliding-window technique is that the M previous delay-offset values $D_O(i)$ need to be individually stored.

Figure 4:
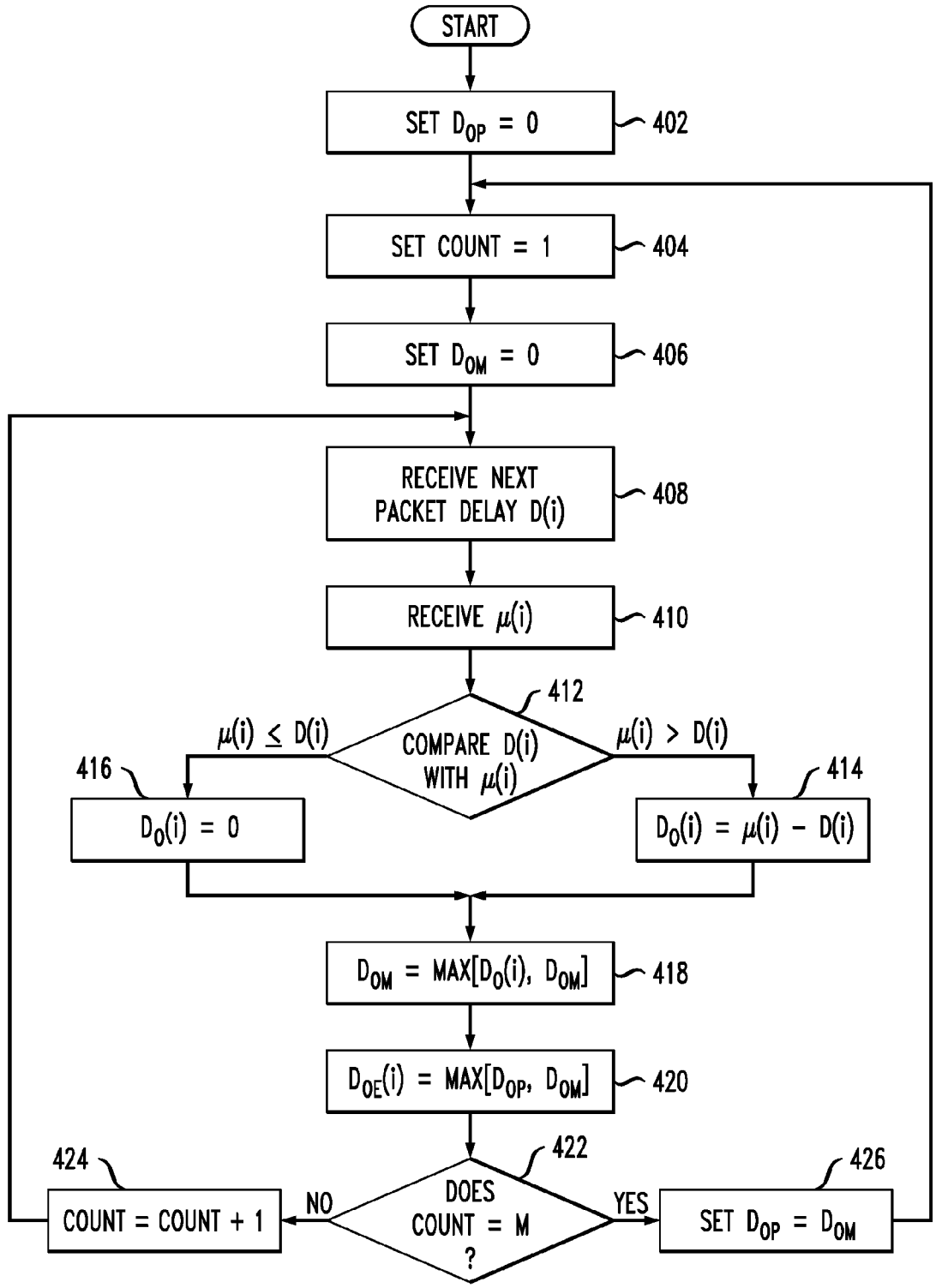
FIG. 4 shows a flow diagram of the processing implemented by the delay-offset estimation component of FIG. 2 to generate the current delay-offset estimate value $D_{OE}(i)$, according to one embodiment of the present invention.

FIG. 4 shows a flow diagram of an alternative windowing technique 400 according to one embodiment of the present invention. Windowing technique 400 is based on two values: (1) the maximum delay-offset $D_{OP}$ for the previous window of M packets and (2) the maximum delay-offset $D_{OM}$ so far for the current window. Windowing technique 400 selects the maximum of these two values as the current value for the delay-offset estimate $D_{OE}(i)$, according to Equation (4) as follows:

$$D_{OE}(i)=\text{MAX}[D_{OP},D_{OM}]. \qquad (4)$$

In the context of ACR system 100 of FIG. 2, windowing technique 400 would be implemented by delay-offset estimation component 204.

Referring to FIG. 4, when ACR system 100 is initially turned on, the value for the maximum delay-offset $D_{OP}$ for the previous window is set to 0 in step 402, the value for the number (Count) of packets so far received in the current window is set to 1 in step 404, and the value for the maximum delay-offset $D_{OM}$ so far in the current window is set of 0 in step 406.

When ACR system 100 receives a packet (i.e., packet i), first PI processor 202 (FIG. 2) updates the mean phase reference μ(i), and delay-offset compensation component 204 (FIG. 2) receives (i) the packet delay D(i) for the newly received packet via signal 112 (FIG. 2) in step 408 and (ii) the updated mean phase reference μ(i) via signal 124 (FIG. 2) in step 410.

Steps 412-418 determine the value for the maximum delay-offset $D_{OM}$ so far in the current window. In particular, in step 412, the packet delay D(i) for the new packet is compared with the updated mean phase reference μ(i). If μ(i)>D(i), then the delay-offset value $D_O(i)$ for the new packet is set to the difference between the updated mean phase reference μ(i) and the new packet delay D(i) in step 414; otherwise, the delay-offset value $D_O(i)$ is set to 0 in step 416. The processing of steps 412-416 is identical to that described previously for Equation (1).

In step 418, the value for the maximum delay-offset $D_{OM}$ so far in the current window is set equal to the current delay-offset value $D_O(i)$, if the current delay-offset value $D_O(i)$ is greater than the previous value for the maximum delay-offset $D_{OM}$; otherwise, the maximum delay-offset $D_{OM}$ is not changed. This processing can be represented according to Equation (5) as follows:

$$D_{OM}=\text{MAX}[D_O(i),D_{OM}]. \qquad (5)$$

In steps 420, the current value for the delay-offset estimate $D_{OE}(i)$ is set equal to the maximum of (i) the maximum delay-offset $D_{OP}$ for the previous window and (ii) the maximum delay-offset $D_{OM}$ so far for the current window, as expressed previously in Equation (4).

Step 422 compares the counter value Count to the window size M to determine whether the new packet is the Mth packet, which would indicate that the current window is finished. If not, then the counter value Count is incremented in step 424 and processing returns to step 408 to await the arrival of the next packet in the current window. If the current window is finished (i.e., Count=M), then what was the current window now becomes the previous window, the maximum delay-offset $D_{OM}$ for the current window is saved as the maximum delay-offset $D_{OP}$ for the previous window in step 426, and processing returns to re-initialize the values for counter Count (step 404) and maximum delay-offset $D_{OM}$ for the (new) current window (step 406) and to await the arrival of the first packet of the new current window (step 408).

Unlike the sliding-window technique, which requires delay-offset estimation component 204 to store the individual values for the M most-recent delay-offset values $D_O(i)$ in addition to whatever other parameters are involved in the particular implementation, windowing technique 404 can be implemented using only the following seven parameters:

Counter value (Count)
New packet delay value (D(i))
Current value of mean phase reference ($\mu(i)$)
Current packet delay-offset value ($D_O(i)$)
Maximum delay-offset value in previous window ($D_{OP}$)
Maximum delay-offset value so far in current window ($D_{OM}$)
Current delay-offset estimate value ($D_{OE}(i)$)

In particular, windowing technique 404 does not need to store the individual values for any delay-offset values $D_O(i)$ other than the current value for the newly received packet.

Figure 5:
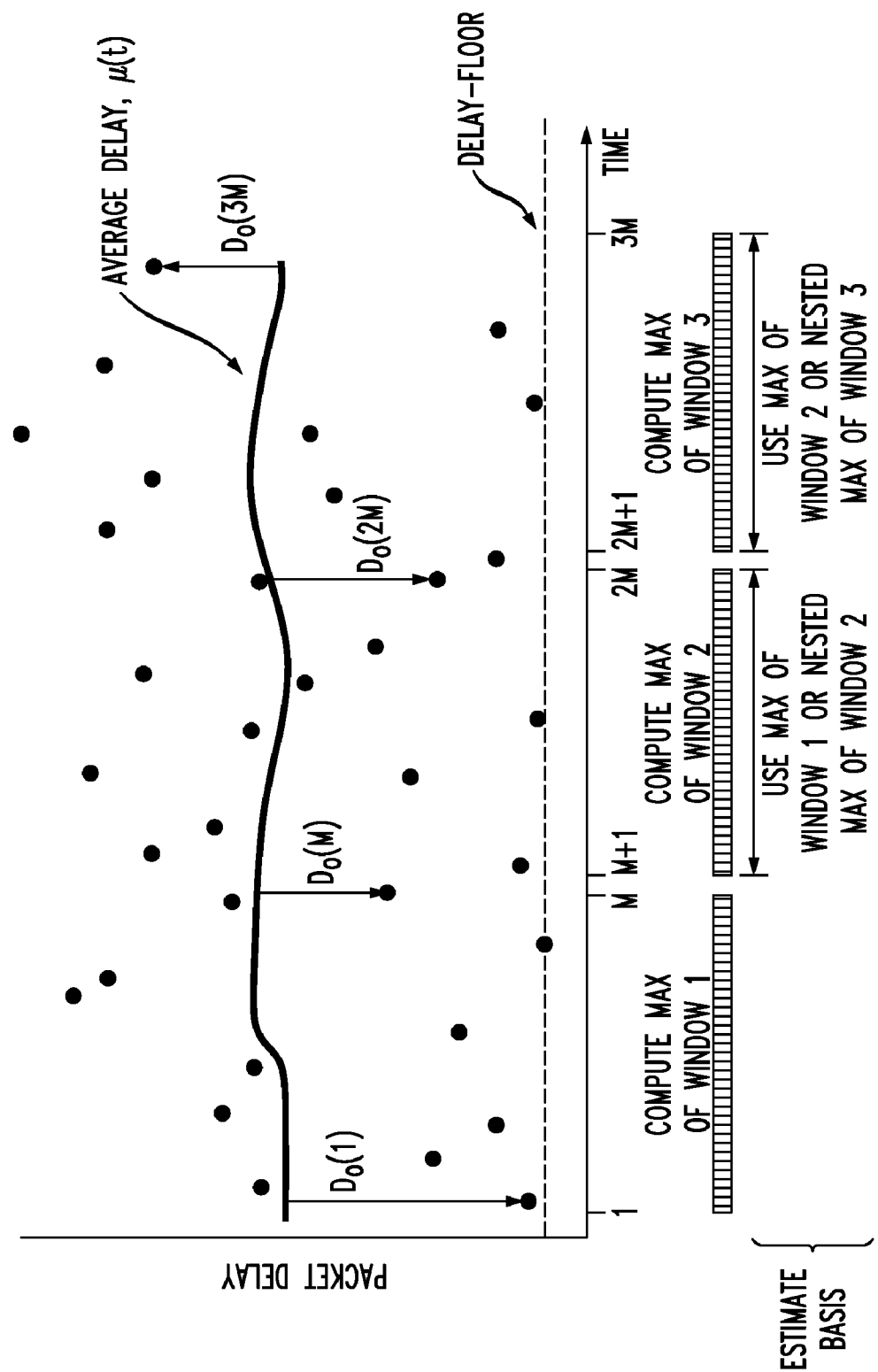
FIG. 5 shows a graphical representation of the windowing technique of FIG. 4.

FIG. 5 shows a graphical representation of windowing technique 400 of FIG. 4. As represented in FIG. 4, for the very first window after system start-up (Window 1), each received packet is processed to determine whether to update the delay-offset estimate $D_{OE}(i)$ based on the maximum delay-offset value $D_{OM}$ for the set of packets received so far in Window 1. For the second window (Window 2), each received packet is processed to determine whether to update the delay-offset estimate $D_{OE}(i)$ based on the maximum delay-offset value $D_{OM}$ for the set of packets received so far in Window 2 as well as the maximum delay-offset value $D_{OP}$ from Window 1. Similarly, for the third window (Window 3), each received packet is processed to determine whether to update the delay-offset estimate $D_{OE}(i)$ based on the maximum delay-offset value $D_{OM}$ for the set of packets received so far in Window 3 as well as the maximum delay-offset value $D_{OP}$ from Window 2, and so on for each subsequent window. Note that, in FIG. 5, the maximum delay-offset value $D_{OM}$ so far in the current window is referred to as the nested maximum value, alluding to the nested nature of the effective sub-windows in the current window, which increase in size by one packet with each newly arrived packet.

Windowing technique 400 of FIG. 4 provides an efficient data analysis process whose physical memory (or register requirements) stays constant as its data sample size increases. Windowing technique 400 computes delay-offset estimate values $D_{OE}(i)$ based on M to 2M contiguous delay-offset values $D_O(i)$. By using the maximum delay-offset value $D_{OP}$ from the previous window and the maximum delay-offset $D_{OM}$ for the set of packets received so far in the current window, a current delay-offset estimate value can be computed with less variation and higher certainty than with conventional windowing techniques.

Alternatives

In one implementation, first and second PI processors 202 and 214 of FIG. 2 are second-order, type 2 PI processors, although processors of other order and/or type may alternatively be used. Although ACR subsystem 120 has been described as being implemented using two PI processors, the three-stage architecture of ACR subsystem 120 can be implemented using other types of closed-loop control processors, such as proportional-integral-derivative (PID) processors, that can be used to generate phase signals that reflect filtered differences between the delays in the arrival of packets at a receiver and a local reference signal.

Although ACR subsystem 120 and step-delay D/M subsystem 130 of FIG. 1 have been described in the context ACR system 100, which performs step-delay pre-compensation, those skilled in the art will understand that the filtering of ACR subsystem 120 and/or the step-delay detection and measurement of D/M subsystem 130 can be implemented in the context of an ACR system that performs other forms of step-delay compensation. For example, in a post-compensation scheme, compensation for a detected and measured step-delay is applied to the output phase signal generated by the ACR subsystem. In other schemes, step-delay compensation is performed internal to the ACR subsystem, for example, by a compensation component that combines the step-delay compensation of component 110 of FIG. 1 with the delay-offset compensation of component 210 of FIG. 2.

In the case of ACR system 100, for the very first window after system start-up, windowing technique 400 determines the maximum delay-offset value over a number of previous packets that ranges from 1 packet (for the first packet in the first window) to M packets (for the last packet in the first window), where M is the specified window size. For every other window after the first window, windowing technique 400 determines the maximum delay-offset value over a number of previous packets that ranges from (M+1) packets (for the first packet in the current window) to 2M packets (for the last packet in the current window).

The technique underlying windowing technique 400 can be modified for other real-world applications (other than adaptive clock recovery) and generalized to determine an extreme value for items other than packets, where the extreme value is either a maximum value for the items or a minimum value for the items and where the extreme value is then used to perform further processing associated with those items.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium or loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A machine-implemented windowing method for finding an extreme value, the method comprising:
   (a) determining and storing a previous extreme value for a previous window corresponding to a previous plurality of items; and
   (b) for each item in a current window corresponding to a current plurality of items:
      (b1) determining and storing a current extreme value so far in the current window corresponding to said each item and any previously processed items in the current window;
      (b2) determining and storing an overall extreme value based on the previous extreme value and the current extreme value so far; and
      (b3) performing further processing associated with the items based on the overall extreme value, without storing the current plurality of items corresponding to the current window for a subsequent window, wherein, at the end of the current window:
   the current window becomes the previous window;
   the previous extreme value is updated to be equal to the current extreme value so far; and
   the current extreme value so far is re-initialized for a new current window, wherein:
      the items are received packets in a packet-based communication system;
      the previous extreme value is a maximum delay-offset value for the previous window of received packets;
      the current extreme value so far is a maximum delay-offset value so far for the current window of received packets;
      the overall extreme value is a current delay-offset estimate value;
      the further processing generates, based on the current delay-offset estimate value, an output phase signal that can be used to generate a recovered clock signal; and
      the method is implemented by an adaptive clock recovery (ACR) system in a receiver of the packet-based communication system.

2. The method of claim 1, wherein the ACR system comprises:
   a first closed-loop control processor that generates a reference phase signal from an input phase signal representing packet delay values corresponding to arrival times of the packets at the receiver;
   a delay-offset estimation component that implements the windowing method, based on the packet delay values and the reference phase signal, to generate the current delay-offset estimate value representative of a delay-floor phase offset for the packet arrival times relative to the reference phase signal;
   a delay-offset compensation component that generates a delay-offset-compensated phase signal based on the reference phase signal and the current delay-offset estimate value; and
   a second closed-loop control processor that generates, from the delay-offset-compensated phase signal, the output phase signal that can be used to generate the recovered clock signal.

3. An adaptive clock recovery (ACR) system for a receiver, the ACR system comprising:
   a first closed-loop control processor that generates a reference phase signal from an input phase signal representing packet delay values corresponding to arrival times of packets at the receiver;
   a delay-offset estimation component that implements a windowing method based on the packet delay values and the reference phase signal to generate a delay-offset estimate signal representative of a delay-floor phase offset for the packet arrival times relative to the reference phase signal;
   a delay-offset compensation component that generates a delay-offset-compensated phase signal based on the reference phase signal and the delay-offset estimate signal; and
   a second closed-loop control processor that generates, from the delay-offset-compensated phase signal, an output phase signal that can be used to generate a recovered clock signal, wherein, to implement the windowing method, the delay-offset estimation component:
      (a) determines and stores a previous maximum delay-offset value for a previous window corresponding to a previous plurality of received packets; and
      (b) for each received packet in a current window corresponding to a current plurality of received packets:
         (b1) determines and stores a current maximum delay-offset value so far in the current window corresponding to said each received packet and any previously received packets in the current window; and
         (b2) determines and stores a current delay-offset estimate value based on the previous maximum delay-offset value and the current maximum delay-offset value so far, without storing all of the delay-offset values corresponding to the current window for a subsequent window, wherein, at the end of the current window:
   the current window becomes the previous window;
   the previous maximum delay-offset value is updated to be equal to the current maximum delay-offset value so far; and
   the current maximum delay-offset value so far is re-initialized for a new current window.

4. A receiver-implemented method for recovering a clock signal in a packet system, the method comprising:
- (a) generating a reference phase signal from an input phase signal representing packet delay values corresponding to arrival times of packets at the receiver;
- (b) implementing a windowing method based on the packet delay values and the reference phase signal to generate a delay-offset estimate signal representative of a delay-floor phase offset for the packet arrival times relative to the reference phase signal;
- (c) generating a delay-offset-compensated phase signal based on the reference phase signal and the delay-offset estimate signal; and
- (d) generating, from the delay-offset-compensated phase signal, an output phase signal that can be used to generate the recovered clock signal, wherein, the windowing method comprises:
  - (b1) determining and storing a previous maximum delay-offset value for a previous window corresponding to a previous plurality of received packets; and
  - (b2) for each received packet in a current window corresponding to a current plurality of received packets:
    - (b2i) determining and storing a current maximum delay-offset value so far in the current window corresponding to said each received packet and any previously received packets in the current window; and
    - (b2ii) determining and storing a current delay-offset estimate value based on the previous maximum delay-offset value and the current maximum delay-offset value so far, without storing all of the delay-offset values corresponding to the current window for a subsequent window, wherein, at the end of the current window:

the current window becomes the previous window;
the previous maximum delay-offset value is updated to be equal to the current maximum delay-offset value so far; and
the current maximum delay-offset value so far is re-initialized for a new current window.

* * * * *